United States Patent
Mirzoev et al.

(10) Patent No.: US 6,844,111 B2
(45) Date of Patent: Jan. 18, 2005

(54) ELECTROCHEMICAL ENERGY STORAGE DEVICE OF HIGH SPECIFIC POWER AND ELECTRODES FOR SAID DEVICE

(76) Inventors: Rustam Aminovich Mirzoev, Russian Federation, 194354 Sankt-Peterburg d.21, korp. 1, kv. 386 (RU); Mikhail Ivanovich Styrov, Russian Federation, 197374 Sankt-Peterburg d. 145, kv. 281 (RU); Natalya Iliinichna Stepanova, Russian Federation, 195273 Sankt-Peterburg d. 58, korp. 2, kv. 85 (RU); Alexandr Ivanovich Maiorov, Russian Federation, 189810 Sankt-Peterburg d. 10, kv. 115 (RU)

( * ) Notice: Subject to any disclaimer, the term of this patent is extended or adjusted under 35 U.S.C. 154(b) by 281 days.

(21) Appl. No.: 10/240,686
(22) PCT Filed: Apr. 9, 2001
(86) PCT No.: PCT/RU01/00147
§ 371 (c)(1), (2), (4) Date: Oct. 3, 2002
(87) PCT Pub. No.: WO01/78172
PCT Pub. Date: Oct. 18, 2001

(65) Prior Publication Data
US 2003/0113629 A1 Jun. 19, 2003

(51) Int. Cl.⁷ .............................. H01M 4/58; H01M 4/52
(52) U.S. Cl. ..................... 429/218.2; 429/221; 429/223
(58) Field of Search ........................... 429/218.1, 218.2, 429/221, 223

*Primary Examiner*—Thomas H. Parsons
(74) *Attorney, Agent, or Firm*—John D. Gugliotta

(57) ABSTRACT

The claimed invention relates to electrical engineering, and in particular to production of rechargeable electrochemical energy storage devices of high specific power. Positive and negative electrodes for electrochemical energy storage device of high specific power according to the invention comprise active element interacting with aqueous alkaline electrolyte in the process of redox charge-discharge reactions made of electron-conductive electrolytic alloy having composition $M_{(l-x-y)}O_xH_y$, where M for positive electrode is nickel or nickel-based alloy, M for negative electrode—a metal out of the group: iron, nickel, cobalt or an alloy on the basis of a metal out of this group, x is atomic fraction of absorbed oxygen in the electrolytic alloy being within the limits of $0.01 \leq x \leq 0.4$, for positive electrode preferably in the limits of $0.05 \leq x \leq 0.4$, y is atomic fraction of absorbed hydrogen in the electrolytic alloy being within the limits of $0.01 \leq y \leq 0.4$, for negative electrode preferably in the limits of $0.05 \leq y \leq 0.4$, the said electrolytic alloy functioning simultaneously as current-carrying collector and as active material.

Electrochemical energy storage devices of high specific power according to three embodiments of the invention comprise at least one negative and one positive electrodes submerged in aqueous alkaline electrolyte and divided by a separator—a layer of ion-conductive but non electron-conductive material.

Enhancement of service life owing to increase in number of recharge cycles under conditions of elimination of ecological harmful cadmium is the technical result achieved by the invention.

20 Claims, 6 Drawing Sheets

ELECTROCHEMICAL ENERGY STORAGE DEVICE OF HIGH SPECIFIC POWER AND ELECTRODES FOR SAID DEVICE

TECHNICAL FIELD

The claimed invention relates to electrical engineering, and in particular to production of rechargeable electrochemical energy storage devices (accumulators, electrochemical capacitors) of high specific power, designed for using them in various branches of engineering, such as automotive industry, electrical tools, communication equipment, special electrical transport (workshop battery-operated trucks, loaders, invalid wheeled vehicles), in toys etc.

BACKGROUND OF THE INVENTION

It is well known that for many technical applications it is necessary to have rechargeable power sources of high specific power (over 0.5 kW/kg) at a rather high specific energy (over 1 kJ/kg). Widespread accumulators of various types have high specific energy (100 kJ/kg and higher) but they are not able to provide high specific power, because they possess too high internal resistance (M. A. Fetcenco et al. In 16$^{th}$ International seminar and exhibit on primary and secondary batteries. Mar. 1–4, 1999, Florida, USA).

Conventional capacitors (oxide-electrolytic, oxide-semiconductor and ferroelectric ones) possess high specific power (10 kW/kg and higher) but low specific energy (less than 0.5 kJ/kg) (D. Evans. The 9$^{th}$ International seminar on double layer capacitors and similar energy storage devices. Dec. 6–8, 1999, Florida, USA).

Combination of high specific power with relatively high specific energy is attained in special electrochemical energy storage devices, for example, in electrochemical "double-layer" capacitors, where energy is accumulated in the form of electrostatic energy of double electrical layer on the boundary between "electrode (electron conductor) and electrolyte (ion conductor)" (N. S. Lidorenko. Reports Acad. Sci. USSR, 1974, vol. 126, p. 1261), in accumulators of special design, characterized with diminished electrode thickness (M. A. Fetcenco et al. In 16$^{th}$ International seminar and exhibit on primary and secondary batteries. Mar. 1–4, 1999, Florida, USA), as well as in hybrid electrochemical capacitors (RU, C1, 2145132),where one electrode accumulates energy in the form of electrostatic charge of double electrical layer, like in electrochemical double-layer capacitors, and another one—in the form of internal energy of electrochemical reactions products, like in accumulators.

Electrochemical double-layer capacitors (N. S. Lidorenko. Reports Acad. Sci. USSR, 1974, vol. 126, p. 1261) have positive and negative electrodes made as a rule of carbon materials with highly developed surface accumulating energy in the form of double-layer charge. Stored specific energy can be calculated by the formula used for any capacitor:

$$E_{sp}^{max}=C \cdot U^2/2m, \quad (1)$$

where $E_{sp}$—specific energy per mass unit,
C—capacitance of the capacitor,
U—operation voltage,
m—mass.

Maximum (peak) specific power of a capacitor is determined with the following formula:

$$P_{sp}^{max}=U^2/4m \cdot R_i, \quad (2)$$

where $R_i$—equivalent internal resistance of the capacitor.

From formulae (1) and (2) it follows that increase in specific energy and specific power of electrochemical double-layer capacitors (at one and the same mass) is possible by means of increasing operation voltage, increasing specific capacitance and decreasing internal resistance.

Increase in operation voltage of electrochemical double-layer capacitors is achieved e.g. by going over to anhydrous organic electrolytes with decomposition voltage over 3 V. However, in this case internal resistance $R_i$ grows, i.e. power decreases. Besides, anhydrous electrolytes are expensive, often toxic, fire hazardous and explosive.

Nevertheless, electrochemical double-layer capacitors with anhydrous electrolytes find an application, achieving in their best samples high enough characteristics: $E_{sp}^{max} \approx 10$ J/g, $P_{sp}^{max} \sim 3.5$ W/g and service life more than one hundred thousand cycles of recharge. Though high cost, fire and explosion hazards are main drawbacks limiting possibilities for use of these capacitors.

Accumulators of special design (M. A. Fetcenco et al. In 16$^{th}$ International seminar and exhibit on primary and secondary batteries. Mar. 1–4, 1999, Florida, USA), characterized with diminished thickness of electrodes, have very high values of specific energy (over 20 J/g), are not expensive, use non-volatile and fire safe aqueous electrolyte, but they have comparatively low power ($P_{sp}^{max}$<1W/g) and limited service life—at most ten thousand cycles of recharge.

The stored specific energy of an accumulator can be calculated by the following formula:

$$E_{sp}^{max}=q_0 \cdot U/m \quad (3)$$

where $q_0$—full charge of the accumulator at discharging by very small current.

At increase in discharge current the charge decreases, accumulator voltage decreases both at the first moment and during discharging, at first slowly, then rapidly. Usually a quick voltage drop cannot be tolerated at operation of an accumulator because of unfavourable effect on service life.

Specific energy $E_{sp}$, released by accumulator at discharge, as well as its specific power $P_{sp}$, depend on discharge current I:

$$E_{sp}=q(I) \cdot U_{av}(I)/m, \quad (4)$$

$$P_{sp}=I \cdot U_{av}(I)/m, \quad (5)$$

where q(I)—charge,
$U_{av}(I)$—average discharge voltage.

To achieve high values of specific power $P_{sp}$ it is necessary to have high ratios I/m, i.e. high current values per mass unit of the accumulator. It is just this reason that explains design peculiarity of high-power accumulator electrodes: very small thickness of both current-carrying collectors and active material.

In hybrid electrochemical capacitors (RU, C1, 2145132) one electrode (usually negative one) operates on the principle of double-layer capacitor, the other (usually positive one)—on the principle of accumulator, therewith aqueous solution of electrolyte is used in the capacitors.

Change of voltage during discharging of a hybrid electrochemical capacitor takes place mainly due to discharging of double-layer carbon electrode while potential of "accumulator" electrode changes relatively weakly. Internal resistance $R_i$ depends on both electrodes since redox reactions proceed with over-voltage.

Due to the above circumstances, hybrid electrochemical capacitors have discharge characteristic similar to that of capacitors and their specific energy and power are determined with formulae (1)–(2). Hybrid electrochemical capacitors occupy an intermediate position between electrochemical double-layer capacitors and accumulators, they have high specific power ($P_{sp}^{max} \approx 3,5$ W/g) and energy ($E_{sp}^{max} \approx 10$ J/g), they are much cheaper than double-layer capacitors with organic electrolyte, they are fire- and explosion-proof. Service life of a hybrid electrochemical capacitor is determined by the positive electrode and, since the discharging charge is usually several times less than its full charge, the number of recharge cycles may be as high as 50–100 thousand cycles. However, due to high price of high-quality carbon material used in negative electrodes price of hybrid electrochemical capacitors is in general higher than that of accumulators.

Positive and negative electrodes for electrochemical energy storage device of high specific power are known each of which is made in the form of backing carrying on one or both sides active element interacting with aqueous alkaline electrolyte of the electrochemical energy storage device in the process of redox reactions of charge/discharge (RU, C1, 2121728).

The backing is made out of electron-conductive but not ion-conductive material that is chemically and electrochemically non-active in the working electrolyte of the electrochemical energy storage device and functions in the electrode simultaneously as a carrying base and as a current lead to the active element.

The active element is structurally formed on the backing by means of applying a coating of a material of initial composition including basic metals out of a certain group or their alloy, or an alloy of at least one metal out of this group with one or several metals-modifiers out of the group: copper, lanthanum or lanthanides, molybdenum, tungsten, manganese, vanadium, titanium, tin, lead, bismuth, gallium; pore-forming metals out of the group: aluminium, zinc, alkali and alkali-earth metals or their combinations with further chemical and/or electrochemical treatment of the coating in solutions of acids, salts or alkalis. Group of basic metals for positive electrodes: iron, nickel, cobalt, silver; for negative electrode: iron, nickel, cobalt, cadmium. As a result of this treatment there are formed at the same time highly-developed surface of the coating (due to etching out of pore-forming metals) and thin oxide and/or hydroxide film of active material on the coating surface—the film made of mono- or polymolecular compounds on the interphase boundary "electrode-electrolyte". Thus, the formed active element constitutes a highly-porous electron-conductive layer with large true surface area coated with electron-nonconductive oxide and/or hydroxide film. The said film and the porous coating on which the film is located form two functionally and structurally independent components (phases) of active element, the first phase functioning as active material and the second phase—as current-carrying collector. Total current supply in the electrode is carried out through the backing.

The said technical concepts are taken as a prototype for the first and second embodiments of the present invention.

The described design of electrodes of an electrochemical energy storage device in which the active material of the active element (thin oxide and/or hydroxide film) is located on the developed surface of the current-carrying collector (a highly-porous layer of coating on the backing) realizes the traditional principle of mutual arrangement of the main phases participating in current-producing reactions of electrode in the electrochemical energy storage device, namely "electron conductor (collector)—active material (oxides, hydroxides)—electrolyte". Due to extremely small thickness of oxide and/or hydroxide film of active material electrochemical reactions of charge-discharge proceed with a high rate which determines high operating characteristics of the electrochemical energy storage device.

Common drawback of the known positive and negative electrodes for electrochemical energy storage device of high specific power is insufficient service life—at most 10,000 cycles of recharge. Besides, maximum specific characteristics of negative electrode are realized when cadmium is used as the base metal, which is an environmental hazardous material.

Another electrochemical energy storage device of high specific power is known in electrodes of which the described traditional concept of mutual arrangement of main phases involved in current producing reactions is realized, comprising at least one negative and one positive electrodes submerged in aqueous alkaline electrolyte and divided by a separator—a layer of an ion-conductive but not electron-conductive material. Each of the electrodes comprises an active element interacting with electrolyte—electron-conductive coating applied on the backing, on the developed surface of which a thin oxide and/or hydroxide active material film is formed taking part in charge-discharge redox reactions of the electrode at operation of the energy storage device. Therewith, the positive and negative electrodes differ by their basic metals being part of coating applied on the backing. For positive electrode these are metals of the group: iron, nickel, cobalt, silver, or their alloys, for negative electrode—metals of the group: iron, nickel, cobalt, cadmium or their alloys (RU, C1, 2121728).

This technical concept is taken as a prototype for third, fourth and fifth embodiments of the present invention.

Discharge characteristic of the electrochemical energy storage device by its shape lies between discharge characteristics of a capacitor and an accumulator, but more close to the latter (Example 5, FIG. 6). At discharge current I=0.5 A the electrochemical energy storage device discharges during about 2.5 seconds at average voltage of about 1 V, then voltage quickly drops. It means that charge q (0.5)= 0.5□2.5=1.25 C, $U_{av}$=1 V. Calculation of electrodes and separator mass based on data of examples 3–5 gives the following: mass of negative electrode is 60 mg, mass of positive electrode is 150 mg, mass of a separator impregnated with electrolyte is approximately 17 mg, total mass being 227 mg. Calculation made according to formulae (4), (5) leads to the following values: $E_{sp}$=5,5 J/g, $P_{sp}$=2,23 W/g.

This shows that in the known electrochemical energy storage device of high specific power the problem of enhancement of specific electrical characteristics is successfully solved at acceptable cost of the device due to use of electrodes of a certain design. Characteristics of specific energy and power achieved in the prototype are well on the level of the best world technology. Thus the electrochemical energy storage device taken as a prototype can compete both with double-layer and hybrid electrochemical capacitors by specific energy and power gaining in price.

Drawback of the known electrochemical energy storage device of high specific power is insufficient service life—at most 10,000 cycles of recharge. Besides, maximum specific characteristics are realized in the known electrochemical energy storage device when cadmium is used as the base metal, which is an environmental hazardous material.

SUMMARY OF THE INVENTION

The problem being solved with the present invention is how to enhance the service life period (increase in number of recharge cycles) and exclude the ecological harmful cadmium as structural material without decreasing the specific power and energy.

Essence of the claimed invention is as follows:

In the first embodiment of the invention—in the positive electrode intended for an electrochemical energy storage device of high specific power which comprises active elements interacting with aqueous alkaline electrolyte in the process of redox charge-discharge reactions—the active element is made of an electron-conductive electrolytic alloy having composition $M_{(1-x-y)}O_xH_y$, where M is nickel or nickel-based alloy, x is atomic fraction of absorbed oxygen in the electrolytic alloy being within the limits of 0.01 to 0.4, y is atomic fraction of absorbed hydrogen in the electrolytic alloy being within the limits of 0.01 to 0.4, the said electrolytic alloy functions simultaneously as current-carrying collector and as active material which is participating in the processes of redox charge-discharge reactions; atomic fraction x of absorbed oxygen in the electrolytic alloy can be preferably within the limits of 0.05 to 0.4. The electrolytic alloy can be obtained by means of mutual electrochemical cathode co-deposition of a metal belonging to said M group of metals and the oxides and/or hydroxides of the M-group. In the case when the active element is formed as an electrolytic deposit that is separated mechanically, chemically or electrochemically from the conductive backing on which it has been deposited on, then the current supply can be carried out directly to the active element; in the case when active element is formed as an electrolytic deposit on one or both sides of a conductive backing which is made of material that is chemically and electrochemically stable in the electrolyte of the electrochemical energy storage device, then the current supply can be carried out through the backing.

In the second embodiment of the invention—in the negative electrode—intended for an electrochemical energy storage device of high specific power which comprises active elements interacting with aqueous alkaline electrolyte in the process of redox charge-discharge reactions—the active element is made of an electron-conductive electrolytic alloy having composition $M_{(1-x-y)}O_xH_y$, where M is a metal of the group: iron, nickel, cobalt, or an alloy on the basis of one of the metals of this group, x is atomic fraction of absorbed oxygen in the electrolytic alloy being within the limits of 0.01 to 0.4, y is atomic fraction of absorbed hydrogen in the electrolytic alloy being within the limits of 0.01 to 0.4, the said electrolytic alloy functions simultaneously as current-carrying collector and as active material which is participating in the processes of redox charge-discharge reactions; atomic fraction y of absorbed hydrogen in the electrolytic alloy can lie preferably within the limits of 0.05 to 0.4. The electrolytic alloy can be obtained by means of mutual electrochemical cathode co-deposition of a metal belonging to the said M group of metals and the oxides and/or hydroxides of the M-group. In the case when the active element is formed as an electrolytic deposit which is separated mechanically, chemically or electrochemically from the conductive backing on which it have been deposited on, then the current supply can be carried out directly to the active element; in the case when the active element is formed as an electrolytic deposit on one or both sides of a conductive backing which is made of material that is chemically and electrochemically stable in the electrolyte of the electrochemical energy storage device, then the current supply can be carried out through the backing.

In the third embodiment of the invention—an electrochemical energy storage device of high specific power comprising at least one negative and one positive electrode which are submerged in an aqueous alkaline electrolyte and divided by a separator—a layer of ion-conductive but non electron-conductive material, each of the electrodes containing an active element interacting with the electrolyte in the process of redox charge-discharge reactions—the active element of each of the electrodes is made of an electron-conductive electrolytic alloy that has the composition $M_{(1-x-y)}O_xH_y$, where M for positive electrode is nickel or nickel-based alloy, M for negative electrode is a metal out of the group: iron, nickel, cobalt or an alloy on the basis of one of the metals of this group, x is atomic fraction of absorbed oxygen in the electrolytic alloy being within the limits of 0.01 to 0.4, y is atomic fraction of absorbed hydrogen in the electrolytic alloy being within the limits of 0.01 to 0.4. The said electrolytic alloy functions simultaneously as current-carrying collector and as the active material participating in the processes of redox charge-discharge reactions. For the positive electrode atomic fraction x of absorbed oxygen in the electrolytic alloy can lie preferably within the limits of 0.05 to 0.4 while for the negative electrode atomic fraction y of absorbed hydrogen in the electrolytic alloy lies preferably within the limits of 0.05 to 0.4.

In the fourth embodiment of the invention—an electrochemical energy storage device of high specific power comprising at least one negative and one positive electrode which are submerged in an aqueous alkaline electrolyte and divided by a separator—a layer of ion-conductive but non electron-conductive material, each of the electrodes containing active element interacting with the electrolyte in the process of the redox charge-discharge reactions—the active element of the negative electrode is made of an electron-conductive electrolytic alloy that has the composition $M_{(1-x-y)}O_xH_y$, where M is a metal out of the group: iron, nickel, cobalt or an alloy on the basis of one of the metals of this group, x is atomic fraction of absorbed oxygen in the electrolytic alloy being within the limits of 0.01 to 0.4, y is atomic fraction of absorbed hydrogen in the electrolytic alloy being within the limits of 0.01 to 0.4. The said electrolytic alloy functions simultaneously as current-carrying collector and as the active material participating in the processes of redox charge-discharge reactions. For the negative electrode the atomic fraction y of absorbed hydrogen in the electrolytic alloy lies preferably within the limits of 0.05 to 0.4.

In the fifth embodiment of the invention—an electrochemical energy storage device of high specific power comprising at least one negative and one positive electrode which are submerged in an aqueous alkaline electrolyte and divided by a separator—a layer of ion-conductive but non electron-conductive material, each of the electrodes containing an active element interacting with the electrolyte in the process of redox charge-discharge reactions—the active element of the positive electrode is made of an electron-conductive electrolytic alloy that has the composition $M_{(1-x-y)}O_xH_y$, where M is nickel or nickel-based alloy, x is atomic fraction of absorbed oxygen in the electrolytic alloy being within the limits of 0.01 to 0.4, y is atomic fraction of absorbed hydrogen in the electrolytic alloy being within the limits of 0.01 to 0.4. The said electrolytic alloy functions simultaneously as current-carrying collector and as the active material participating in the processes of redox charge-discharge reactions. For the positive electrode the atomic fraction x of absorbed oxygen in the electrolytic alloy lies preferably within the limits of 0.05 to 0.4

The shared inventive concept that unites the embodiments of the present invention is the realization of a new principle of mutual arrangement of the main phases participating in the current producing reactions of the electrodes. While in all conventional electrodes the active material lies on the collector surface thus realizing the common principle of mutual arrangement of phases: "electron conductor (collector)—active material (oxides, hydroxides)—electrolyte", in the present invention the active material is inside the metal collector being a part of its crystal structure and forms with it a single phase—the phase of "active element".

To the applicant's knowledge there is no technical concepts identical to the claimed ones. It allows, according to the applicant's opinion, to draw a conclusion that the invention corresponds to the "novelty" criterion (N).

As a result of realization of the features of the invention new important properties of the energy storage device are achieved. The new arrangement of active material inside the metal collector brings on a number of important consequences, which radically change the properties of electrodes and of energy storage devices as a whole. In particular, there is no contact resistance between the collector and the active material and loss of electronic contact between the collector and the particles of active material is impossible as well as are flaking and peeling off of the active material from the collector. All this makes it possible to create extremely thin electrodes which is the main direction for increasing specific power.

It is just these fundamentally new properties of electrodes that permit to accomplish, in the framework of the claimed embodiments, the set task of enhancement of service life (increase in number of recharge cycles) without decrease (even with increase) in specific power and energy. In particular, absence of contact resistance "collector-active material" in the electrodes and low resistance of active material permit to increase specific power, impossibility of flaking and peeling off of active material from the collector and impossibility of loss of electronic contact between them permit to increase substantially durability of the electrodes at cyclic load, while combination of functions of current collector and of active material in electrolytic alloy makes it possible to reduce mass of electrodes and consequently to increase specific energy and power of the electrochemical energy storage device.

In the framework of the shared inventive concept that unites the embodiments of the present invention there is proposed a new and practically useful application of the phenomenon of excessive hydrogen and oxygen absorption by electrolytically deposited metal, namely, there are proposed electrodes with electrolytically deposited metal carrying inside its structure absorbed hydrogen and oxygen, and electrochemical storage devices with such electrodes.

The new principle arrangement of main phases participating in current producing reactions of electrode is characterized by absence of direct contact of oxides and/or hydroxides with the electrolyte. At first sight, according to the common opinion, it can be evidence of unfeasibility of the claimed concepts. However, in reality it is not so, the claimed concepts are quite feasible and industrially applicable which can be explained in the following way.

As is well known, on nickel-oxide positive electrode of alkaline accumulators (nickel-cadmium, nickel-zinc, nickel-iron ones) the following reaction proceeds:

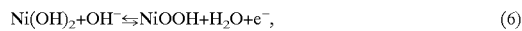

$$Ni(OH)_2 + OH^- \leftrightarrows NiOOH + H_2O + e^-, \quad (6)$$

where direction from left to right is charging, from right to left is discharging.

In this reaction (6) hydroxide-ion and electrolyte water participate, i.e. the reaction proceeds under conditions when nickel hydroxide is in contact with electrolyte It may appear that if $Ni(OH)_2$ molecules are arranged inside the metal phase of the active element then the proceeding of reaction (6) is impossible. However, as experience shows and as the explanatory examples given below indicate, it is not the case, reaction (6) proceeds, and with rather high rate, even under these conditions. In order to explaine this it is practical to re-write reaction (6) in a little different form taking into account possible presence of absorbed hydrogen $H_{ab}$ in the matrix of the active element:

(7)

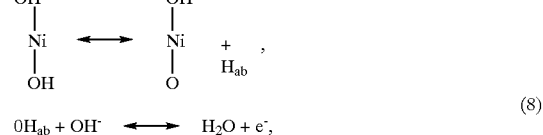

$$OH_{ab} + OH^- \leftrightarrows H_2O + e^-, \quad (8)$$

where direction from left to right is charging, from right to left is discharging.

Combination of reactions (7) and (8) gives the reaction of internal oxidation of nickel which is related to absorption of oxygen and to decrease of absorbed hydrogen content in nickel. Reaction (8) proceeds on the surface of active element in contact with the electrolyte, reaction (7)—in the volume of the active element, so that mechanism of reactions (7)-(8) implies diffusion of absorbed hydrogen in the active element.

Presence of a great amount of absorbed hydrogen in electrolytic alloys (deposits) of metals and its rather high diffusion rate have been established long ago (O. P. Smith. Hydrogen in metals. Chicago, USA, 1948, 367 p). It has been noted that the amount of absorbed hydrogen in electrolytic deposits of such metals as tin, copper, nickel, cobalt, iron, manganese, chromium, zinc, and in the electrolytic alloys on the basis of these metals is several orders larger than the equilibrium solubility of hydrogen in the same metals and alloys obtained in a metallurgical process. The reasons for this phenomenon are being discussed, beginning with the very early works and up to the present time, and up to now they have remained unclear. Nevertheless, the availability of hydrogen able to be absorbed by electrolytically deposited metals and alloys, is beyond question and creates theoretical prerequisite for practical implementation of this phenomenon not only for positive electrodes (to provide proceeding of reactions of (7)-(8) type) but also for negative electrodes where reactions of hydrogen absorption/desorption can proceed:

$$H_2O + e^- \leftrightarrows H_{ab} + OH^-, \quad (9)$$

where direction from left to right is charging, from right to left is discharging.

For example, in cited above book by O. P. Smith it has been established that electrolytic alloys (deposits) of iron can absorb up to 3% at. of hydrogen, nickel—up to 0.4% at, cobalt—up to 1.6% at. It can be easily calculated that a 30 □m thick galvanic deposit (mass 25 mg/cm$^2$) containing 5% at. of hydrogen can accumulate a charge according to reaction (9) of about 2.5 C/cm$^2$ which exceeds by several times the specific charge of e.g. electrode of carbon materials operating by double-layer mechanism (see RU, C1, 2145132).

Observations made by L. V. Volkov et al. (L. V. Volkov, S. I. Gusev, V. N. Andrushchenko. Non-ferrous metals, 1981, No. 2, pp. 28–29) that there exists a strong correlation between content of absorbed oxygen and absorbed hydrogen in electrolytic nickel, atomic ratio between hydrogen and oxygen being between one and two, are of fundamental importance as theoretical evidence of feasibility in realizing the claimed concepts. In the article there is no explanation of this fact but one can suppose that (M-OH)-groups being present in electrolytic deposit can somehow coordinate nearby them one more atom of hydrogen. Regardless of mechanism of this phenomenon, it is of great importance for practical realization of the claimed concepts: the more (M-OH)-groups the electrolytic alloy (deposit) contains the more hydrogen it is able to absorb, consequently the more charge can be accumulated both by reactions (7)–(8) and (9). It means that the more absorbed oxygen the electrolytic deposits, e.g. nickel or nickel alloys, contain, the more they contain absorbed hydrogen as well, and that means—the better they would operate both as positive and negative electrodes.

The explanatory examples given below corroborate this proposition, not at all self-evident, which is a consequence of the known scientific facts above.

It is worth noting that many works on studying the hydrogen absorption in electrolytically deposited metals are directed towards studying problems for overcoming the harmful effect of "hydrogenization" causing "embrittlement" and peeling off the galvanic deposits and appearance of unwanted entrapped gases in electrolytically obtained nickel, etc. The works known to public don't contain any information or recommendations on the employment of the "hydrogenization" phenomenon in the electrodes of electrochemical storage devices nor any other useful employment of the phenomenon.

Considering the phenomenon of excessive hydrogen and oxygen absorption not as a deleterious phenomenon but as a useful one it is possible to deliberately increase the content of hydrogen and oxygen by optimizing the electric deposition process, e.g. enhancing the current density during electric deposition (O. P. Smith. Hydrogen in Metals. Chicago, USA, 1948, 367 p.). It would be appropriate to use for positive electrode electrolytic nickel or electrolytic alloy on the basis of nickel, in which atomic fraction of absorbed oxygen x is within the limits of $0.01 \leq x \leq 0.4$, preferably within the limits of $0.05 \leq x \leq 0.4$, and for negative electrode electrolytic nickel, iron, cobalt or electrolytic alloys on the basis of these metals, in which atomic fraction of absorbed hydrogen y is within the limits of $0.01 \leq y \leq 0.4$, preferably within the limits of $0.05 \leq y \leq 0.4$.

The choice of material composition for positive and negative electrodes is dictated by the following considerations.

In the region of potentials where positive electrode operates only a small group of metals (nickel, silver, noble metals) is stable in alkaline aqueous solutions. Cobalt and iron are stable to a lesser extent. Therefore, from economical point of view the most preferable material for active element of a positive electrode is electrolytic nickel or electrolytic alloys on its basis containing rather large number of (M-OH)-groups in the structure but not too large, in which case electrolytic deposits could be too brittle and with low conductivity.

In the region of potentials where negative electrode operates the following metals and alloys on their basis are stable in alkaline aqueous solutions: iron, nickel, cobalt, cadmium, zirconium. Bismuth and titanium are stable at a lesser extent. Cadmium is to be excluded on ecological grounds and zirconium—on economical grounds. Therefore, preferable materials for negative electrode are electrolytic iron, nickel, cobalt and electrolytic alloys on the basis of one of these metals, containing large enough amount of absorbed hydrogen however not so large as to obtain too brittle electrolytic deposits having too low conductivity.

The said limits of absorbed oxygen and hydrogen content in the active element material of positive and negative electrode respectively have been determined on the basis of experimental results. In particular, the experiments have shown that at absorbed oxygen and hydrogen content beyond 40% at. the electrolytic deposits lose their plasticity, become brittle and can crumble and peel off under cyclic loads. At oxygen content in positive electrode and hydrogen content in negative electrode below 5% at. specific charges of charging/discharging of the electrodes are too small and such electrodes cannot compete with commercially known electrodes.

It should be particularly emphasized that the offered electrodes of electrolytic alloys (the first and the second embodiments of the claimed invention) can be used in electrochemical energy storage devices either together (the third embodiment of the invention) or in different combinations with known electrodes (the fourth and fifth embodiments of the invention). Thus, the negative electrode according to the second embodiment in accordance with the fourth embodiment of the invention can be used with a known positive electrode, e.g. with positive electrode of prototype, and the positive electrode according to the first embodiment in accordance with the fifth embodiment of the invention can be used with a known negative electrode, e.g. made of a carbon material.

To the applicants' knowledge the works known to the public don't contain any information about influence of characteristic features of the claimed concept on the reached technical result. The said circumstance allows to draw a conclusion that the claimed technical concepts conform the criterion "inventive standard" (IS).

BRIEF DESCRIPTION OF THE DRAWINGS

Hereinafter the invention will be elucidated with detailed description of 15 examples of realization of the same with reference to the accompanying drawings, in which.

DESCRIPTION OF THE PREFERRED EMBODIMENTS

The claimed electrochemical energy storage device of high specific power according to the third embodiment of the claimed invention in the realization variant being discussed (FIG. 1) comprises negative electrode 1 and positive electrode 2 manufactured according to the first and second embodiments of the claimed invention.

Figure 1:
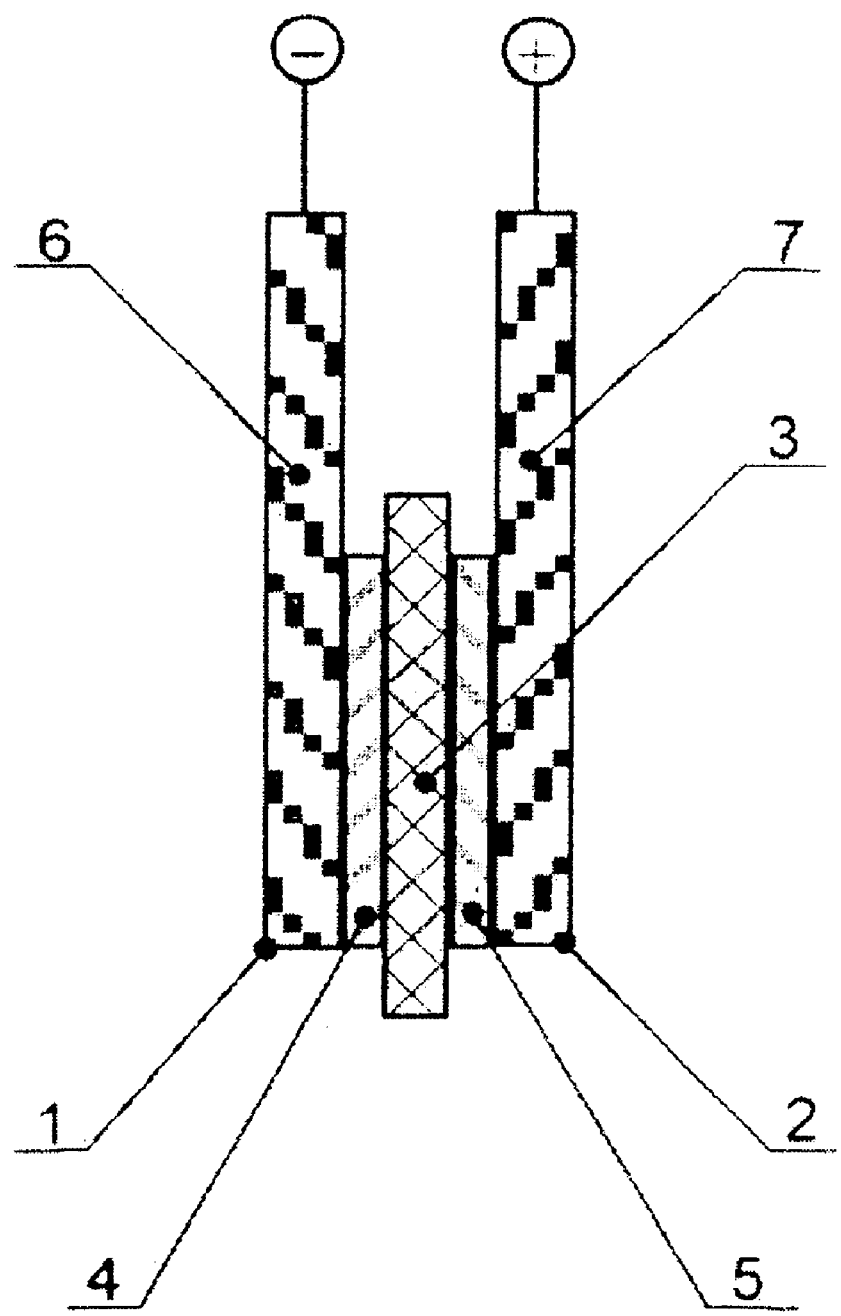
In FIG. 1 there is presented a schematic diagram of a double-electrode electrochemical energy storage device in the variant with the claimed electrodes on the backing.

Electrodes 1 and 2 are submersed in aqueous alkaline electrolyte (not shown in FIG. 1). Electrodes 1 and 2 are set apart by a separator 3—a layer of ion-conductive but non electron-conductive material. As separator e.g. a layer of porous polymer impregnated with electrolyte can be used.

Negative 1 and positive 2 electrodes comprise active elements 4 and 5 interacting with electrolyte in the process of redox reaction of charging/discharging. Active elements 4 and 5 are made of a conductive electrolytic alloy (deposit) which simultaneously functions as current-carrying collector and as active material taking part in processes of charging/discharging redox reactions in electrodes 1 and 2 respectively.

Active element 4 of negative electrode 1 is made of an electron-conductive electrolytic alloy (deposit) of composition $M_{(1-x-y)}O_xH_y$, where M is metal of the following group: iron, nickel, cobalt, or an alloy on the basis of one of the metals of this group with content of the main component at least 40% mass., x is atomic fraction of absorbed oxygen in the electrolytic alloy being within limits of $0.01 \leq x \leq 0.4$, y is atomic fraction of absorbed hydrogen in the electrolytic alloy being within limits of $0.01 \leq x \leq 0.4$, preferably within limits of $0.05 \leq y \leq 0.4$. The said limits of absorbed hydrogen content are caused by the fact that at lesser hydrogen content specific charge of charging/discharging is too small and does not provide competitiveness of the negative electrode while at larger content the deposit becomes brittle and its cycling stability falls.

Active element 5 of positive electrode 2 is made of an electron-conductive electrolytic alloy (deposit) of composition $M_{(1-x-y)}O_xH_y$. where M is nickel or a nickel-based alloy with content of the main component at least 40% mass., x is atomic fraction of absorbed oxygen in the electrolytic alloy being within limits of $0.01 \leq x \leq 0.4$, preferably within the limits of $0.05 \leq x \leq 0.4$, y is atomic fraction of absorbed hydrogen in the electrolytic alloy being within limits of $0.01 \leq x \leq 0.4$. The said limits of absorbed oxygen content are caused by the fact that at lesser oxygen content specific charge of charging/discharging is too small and does not provide competitiveness of the negative electrode while at larger content the deposit becomes brittle and its cycling stability falls.

The said electrolytic alloys (deposits) are obtained by mutual electrochemical cathode co-deposition of metals belonging to the said groups M, their oxides and/or hydroxides.

In the discussed example of realization the active elements 4 and 5 of electrodes 1 and 2 are formed as electrolytic deposits on respective conductive backings 6 and 7, through which in the present design current supply to the active elements 4 and 5 is carried out. In order to realize their functions the backings 6 and 7 are made of a material chemically and electrochemically stable in the working electrolyte of the electrochemical energy storage device.

In other variants of realization (not shown in FIG. 1) the active elements 4 and 5 of the electrodes 1 and 2 can be formed as independent constructive elements as electrolytic deposits mechanically, chemically or electrochemically separated from respective conductive backings on which they have been deposited. In this case the active elements 4 and 5 are used without backings and current supply in electrodes 1, 2 is carried out directly to the active elements 4 and 5.

Electrochemical energy storage device according to the fourth embodiment of the claimed invention differs from the above considered electrochemical energy storage device according to the third embodiment of the claimed invention by that, that as positive electrode any known and used for such purposes positive electrode is employed provided that it is stable in aqueous alkaline electrolyte, e.g. positive electrode made of carbon, nickel, cobalt or silver. In particular, the positive electrode described in prototype can be used as a positive electrode.

Electrochemical energy storage device according to the fifth embodiment of the claimed invention differs from the electrochemical energy storage device according to the third embodiment of the claimed invention by that, that as negative electrode any known and used for such purposes negative electrode is employed provided that it is stable in aqueous alkaline electrolyte, e.g. a negative electrode made of carbon, nickel, cobalt or iron. In particular, carbon electrode used in hybrid, capacitors can be employed as negative electrode.

The electrochemical energy storage devices made in the way considered above (according to the third, fourth and fifth embodiments) are characterized with improved specific characteristics and increased service life which is defined by permissible number of charge/discharge cycles. Improvement of properties is caused with that a new principle of mutual arrangement of main phases participating in current producing reactions is realized in the electrodes which differs from the prototype and consists in that active material (oxides and/or hydroxides) is arranged within a metal collector (being a part of its crystal structure) and forms with it a unified phase—the phase of "active element".

The examples of specific executions of electrodes and electrochemical energy storage devices given below confirm feasibility and industrial applicability of the claimed invention and attainment of the required result.

The elucidatory examples 1 to 7 relate to negative electrodes according to the second embodiment of the claimed invention. Conditions of production (electrolyte composition, electrolysis conditions) and properties of negative electrodes according to examples 1 to 7 are presented in Table 1 in the end of the description. Conditions and methods of measurement are similar for all the elucidatory examples 1–7 and presented in example 1.

EXAMPLE 1

The negative electrode is obtained by electrochemical deposition (electrodeposition) of nickel on the backing made of rolled nickel foil 25 µm thick under conditions given in Table 1. The composition of the obtained electrolytic alloy (deposit)—$Ni_{0.67}O_{0.13}H_{0.2}$—was defined by gas analysis of the deposit. Specific charge of the electrode was defined by discharge curves at galvanostatic discharge of the electrode in 30% KOH solution. Prior to discharge the electrode was held at the potential of minus 1.0 V against mercury oxide reference electrode during 5 minutes. Discharging with current density of 0.1 A/cm² continued until attainment of potential of minus 0.6 V. The discharge curve was plotted by a high speed recorder. The specific charge was defined by multiplying the time of discharge in seconds by the current density 0.1 A/cm². At deposit thickness of 25 μm (mass being 20 mg/cm²) specific charge of the electrode is 2.3 C/cm² or 115 C/g. This value is five times higher than corresponding value for negative electrode in the prototype.

EXAMPLE 2

The negative electrode is obtained as in example 1 but in a different electrolyte and under different conditions of electrochemical deposition (see Table 1). Composition of the obtained electrolytic sediment is $Ni_{0.63}O_{0.15}H_{0.22}$, mass is 17 mg/cm², specific charge is 165 C/g which is higher than in example 1.

EXAMPLE 3

The negative electrode is obtained (see Table 1) by electrodeposition of nickel-cobalt alloy on polished titanium backing with following mechanical separation of the deposit from the backing (galvanoplastic method). Cobalt chloride was added to the electrolyte. Composition of the obtained electrolytic deposit is $Ni_{0.52}Co_{0.10}O_{0.015}H_{0.23}$, mass is 17 mg/cm², specific charge is 170 C/cm². The deposit separated from the backing is plastic and can be used as an electrode without any additional collector.

EXAMPLE 4

The negative electrode is obtained (see Table 1) by electrodeposition of nickel-iron alloy on polished titanium backing with following mechanical separation of the deposit from the backing. Ferrous iron sulphate was added to the electrolyte. Composition of the obtained electrolytic deposit is $Ni_{0.53}Fe_{0.13}O_{0.14}H_{0.20}$, mass is 24 mg/cm², specific charge is 133 C/g. The electrolytic deposit separated from the backing is strong, plastic and can be used as an electrode without any additional collector.

EXAMPLE 5

The negative electrode is obtained (see Table 1) by electrodeposition of cobalt-nickel alloy on polished titanium backing with following mechanical separation of the deposit from the backing. Composition of the obtained electrolytic deposit is $Co_{0.54}Ni_{0.15}O_{0.13}H_{0.18}$, mass is 20 mg/cm², specific charge is 150 C/g. The electrolytic deposit separated from the backing is strong, plastic and can be used for forming of a cylindrical electrode, e.g. by winding on a cylindrical mandrel Ø5 mm.

EXAMPLE 6

The negative electrode is obtained (see Table 1) by electrodeposition of nickel-iron alloy on polished titanium backing with following mechanical separation of the deposit from the backing. Composition of the obtained electrolytic deposit is $Fe_{0.47}Ni_{0.16}O_{0.12}H_{0.25}$, mass is 31 mg/cm², specific charge is 129 C/g. The deposit separated from the backing is strong, plastic and can be used as an electrode without any additional collector.

EXAMPLE 7

The negative electrode is obtained (see Table 1) by electrodeposition of nickel-palladium alloy on a backing of rolled nickel foil 25 μm thick. Composition of the obtained electrolytic deposit is $Ni_{0.60}Pd_{0.03}O_{0.16}H_{0.21}$, mass is 17 mg/cm², specific charge is 176 C/g.

The presented examples 1 to 7 prove possibility of practical realization of the second embodiment of the claimed invention in respect to negative electrodes. In these examples the content of absorbed hydrogen in electrolytic alloys (deposits) varied between 18% and 25% at. Additional experiments related to determination of limits of permissible content of absorbed hydrogen in electrolytic alloys (deposits) used in negative electrodes have shown that at increase in absorbed hydrogen content up to 40% at. the charge released while discharging has increased as well as the specific energy however the electrolytic alloy (deposit) has become brittle and could only be used on a backing, e.g. on nickel foil or mesh. For electrodes obtained by galvanoplastics method in which current supply is carried out directly to the active element (electrolytic deposit) the hydrogen content must be lower, e.g. similar to hydrogen content in the above discussed examples 1 to 7. The lower limit for absorbed hydrogen content in electrolytic deposit for a negative electrode must not be below 1% at. because at this point the specific charge falls down to values that make the electrode useless for practical applications.

The following explanatory examples 8 to 10 relate to positive electrodes according to the first embodiment of the claimed invention. Conditions of fabrication (electrolyte composition, electrolysis conditions) and properties of positive electrodes according to these examples are presented in Table 2 in the end of the description. Conditions and methods of measurement according to these examples are similar and presented in example 8.

EXAMPLE 8

The positive electrode is obtained by electrochemical deposition (electrodeposition) of nickel on a backing of nickel foil 25 μm thick under conditions given in Table 2. Composition of obtained electrolytic alloy (deposit) is $Ni_{0.65}O_{0.18}H_{0.17}$, mass is 25 mg/cm², specific charge is 88 C/g.

Specific charge was defined by the galvanostatic discharging curve from potential +0.52 V down to +0.1 V by current density 0.1 A/cm² in 30% aqueous KOH solution. Before discharge the electrode was held at potential +0.52 V during 5 minutes.

Figure 2:
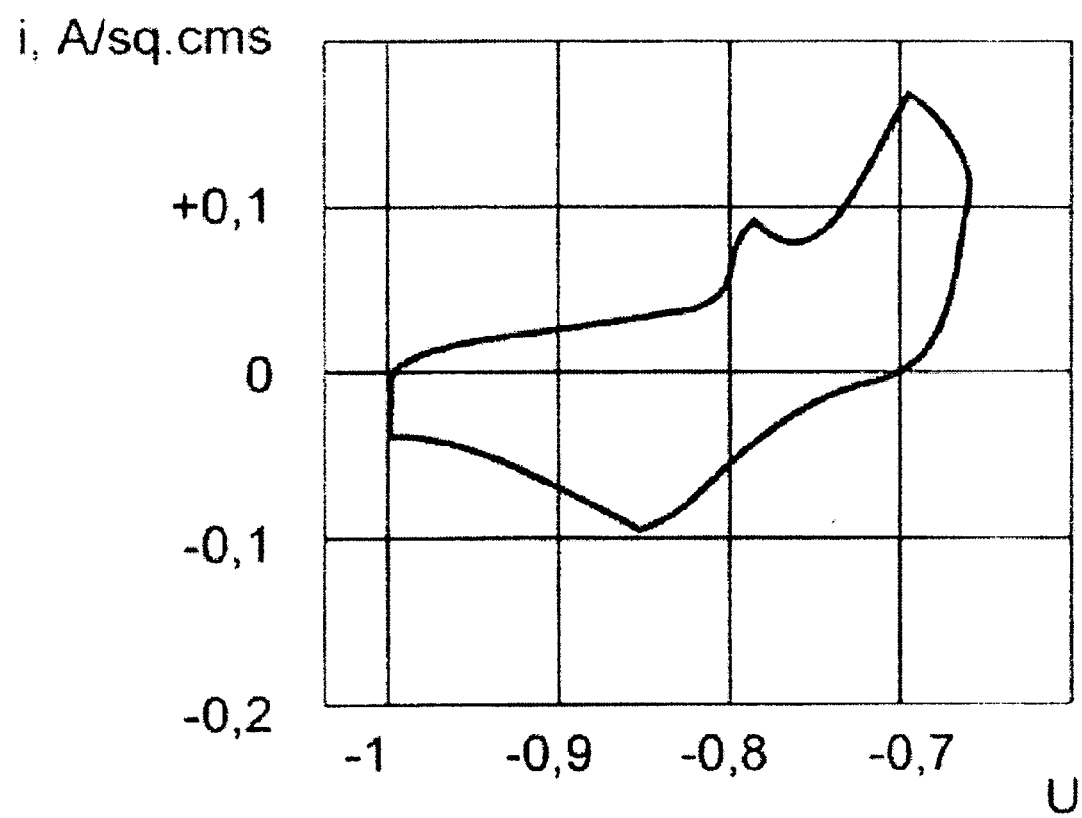
In FIG. 2 there is presented a cyclic voltammagram of the claimed electrode according to the eighth example in the region of potentials for operation of negative electrode.

In FIG. 2 there is presented a cyclic voltammagram of the electrode according to the eighth example in 30% KOH solution. The electrode area is 4 cm², reference electrode is a mercury oxide electrode, sweep rate is 10 mV/s. At the charging potential minus 1.0 V the holding time was 50 seconds.

Figure 3:
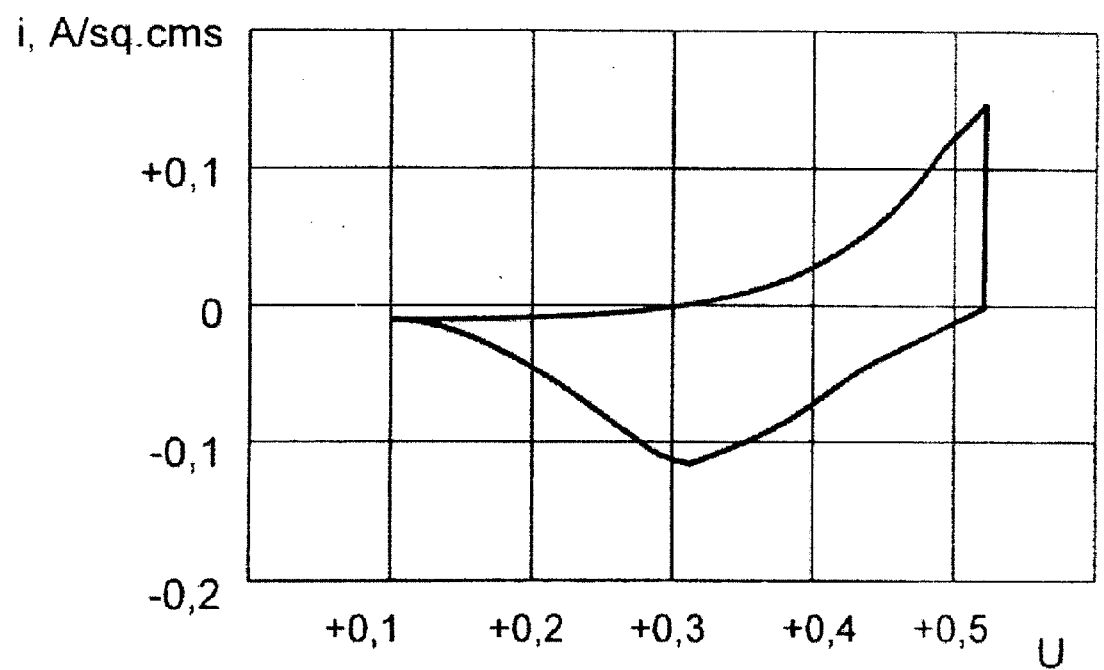
In FIG. 3 there is presented a cyclic voltammagram of the claimed electrode according to the eighth example in the region of potentials for operation of positive electrode.

In FIG. 3 there is presented a cyclic voltammagram of the same electrode but in the potential region of positive electrode operation. Sweep rate is 10 mV/s. At the charging potential +0.52 V the holding time was 50 seconds.

EXAMPLE 9

The positive electrode is obtained (see Table 2) by electrodeposition of a nickel-cobalt alloy on a backing of nickel foil 25 μm thick. Composition of the obtained electrolytic deposit is $Ni_{0.55}Co_{0.1}O_{0.19}H_{0.16}$, mass is 25 mg/cm², specific charge is 96 C/g.

Figure 4:
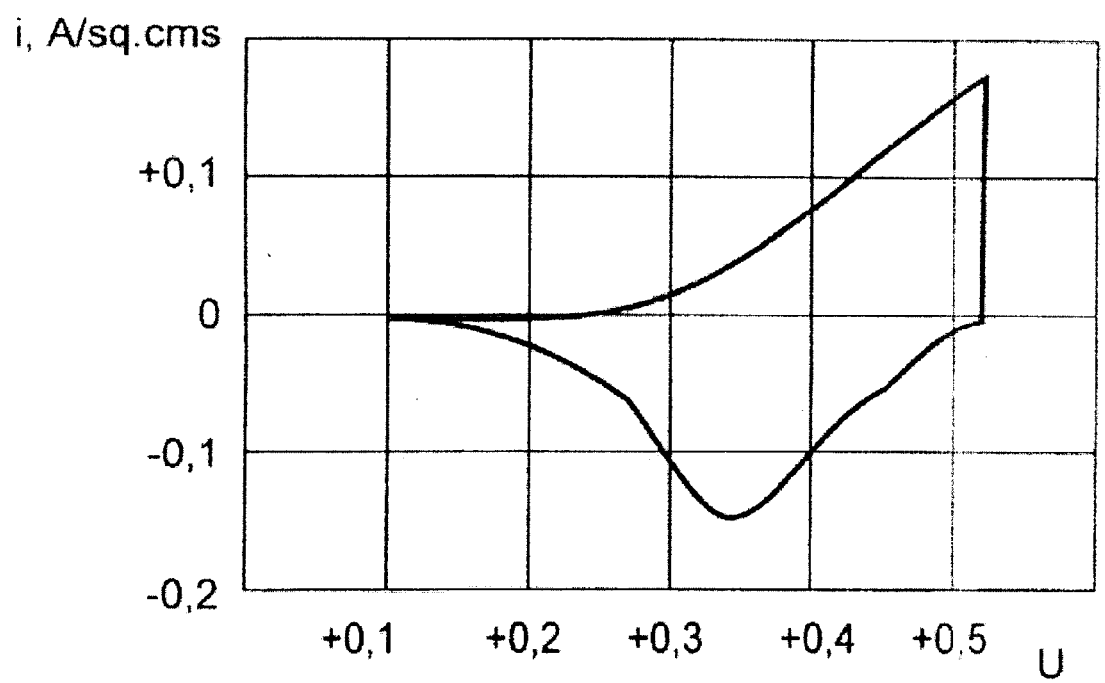
In FIG. 4 there is presented a cyclic voltammagram of the claimed electrode according to the ninth example in the region of potentials for operation of positive electrode.

In FIG. 4 there is presented a cyclic voltammagram of the electrode according to the ninth example in the potential region of positive electrode operation. The electrode area is 4 cm², sweep rate is 10 mV/s. At the charging potential +0.55 V the holding time was 50 seconds. Comparison of voltammagrams in FIG. 3 and in FIG. 4 shows that by alloying it is possible to increase the specific charge of the positive electrode.

EXAMPLE 10

The positive electrode is obtained (see Table 2) by electrodeposition of a nickel-zinc-cobalt alloy on a polished titanium backing with following mechanical separation of the deposit from the backing (galvanoplastic method). Composition of the obtained electrolytic deposit is $Ni_{0.52}Co_{0.09}Zn_{0.02}O_{0.20}H_{0.17}$, mass is 36 mg/cm$^2$, specific charge is 119 C/cm$^2$.

The presented examples 8 to 10 prove feasibility of practical realization of the first embodiment of the claimed invention in respect to positive electrodes. In these examples content of absorbed oxygen in electrolytic alloys (deposits) varied from 18% to 20% at. Additional experiments related to determining permissible limits of absorbed oxygen content in electrolytic alloys (deposits) used in positive electrodes have indicated that at increase of absorbed oxygen content up to 40% at. the charge released at discharging increased as well as the specific energy however the electrolytic alloy (deposit) lost its strength and plasticity, its conductivity decreased. At absorbed oxygen content below 1% at. the specific charge falls down to values that make the electrode useless for practical applications.

It is of great importance to emphasize the following fact, which is readily apparent from analyzing cyclic voltammagrams of the electrode according to the eighth example (see FIGS. 2 and 3). The cyclic voltammagrams FIGS. 2 and 3 were measured on one and the same electrode, first in the region of cathode potentials, then in the region of anode potentials. These voltammagrams prove that one and the same electrode made according to the first or second embodiment of the claimed invention can operate both as negative and as positive electrode. This supports validity of earlier presented explanations of possible mechanism of charging-discharging processes for positive and negative electrodes in accordance with reactions (7)–(8) and (9). It can also be stated that the established fact that one and the same electrode can operate both as negative and positive electrode is the best proof in favor of the hypothesis that absorbed hydrogen and oxygen dwell in electrolytic deposits in the form of M-OH groups, possibly in very fine-dispersed phase. At any rate, SEM photographs of deposits at magnification ×30,000 did not permit to distinguish any fine structure of the deposit. It should be noticed as well that though negative electrodes (Table 1) can operate as positive ones, it is still better to chose most suitable deposition conditions specially for obtaining positive electrodes (Table 2).

Two waves of discharging current are readily seen in the voltammagram FIG. 2. They indicate existence of two forms of absorbed hydrogen in the active material of the electrode. One form of weaker bonded hydrogen is absorbed at potentials from minus 0.9 V to minus 1.0 V and desorbed at potentials from minus 1.0 V to minus 0.75 V, the second form, more strongly bonded, is absorbed at potentials from minus 0.8 V to minus 0.9 V and is desorbed at potentials from(minus 0.75 V to minus 0.65 V. Such a behavior correlates with conclusions made half a century ago (Yu. V. Baymakov, L. M. Yevlannikov. J. Ph. Ch., 1951, v.25, issue 4, pp. 483–494) about existence of two forms of absorbed hydrogen being released at vacuum annealing, one form at a temperature of 450–500° C., the other at temperatures beyond 800° C.

The proposed negative and positive electrodes presented in examples 1 to 7 (see Table 1) and in examples 8 to 10 (see Table 2) can be used in the following three variants of electrochemical energy storage devices: with both proposed electrodes—positive and negative ones which corresponds to the third embodiment of the claimed invention; with proposed negative electrode and a known positive electrode, e.g. an electrode of the prototype, which corresponds to the fourth embodiment of the claimed invention; with proposed positive electrode and a known negative electrode, e.g. a carbon one, which corresponds to the fifth embodiment of the claimed invention.

Models of electrochemical energy storage devices related to the first variant of execution are presented in examples 11–12, the second variant is presented in example 13, the third one—in example 14. Example 15 is a reference example, it relates to an electrochemical energy storage device in which a known negative electrode of carbon material and a known positive electrode made in accordance with the prototype are used.

The properties of electrochemical energy storage devices according to examples 11–15 are presented in Table 3 given in the end of the description. Measurement conditions in examples 11–15 are similar and presented in example 11.

EXAMPLE 11

The model of electrochemical energy storage device according to the third embodiment of the claimed invention is assembled of the negative electrode described in example 6 and the positive electrode described in example 10 divided by separator of 0.05 mm thick polypropylene paper wetted with electrolyte—30% KOH solution. The model of electrochemical energy storage device was charged by current of 0.4 A up to voltage of 1.5 V, then held during 5 minutes at constant voltage of 1.5 V. Discharge curves were recorded at three constant values of the current 0.04 A, 0.4 A and 1.6 A at temperature 20° C. Change of voltage in time was plotted with a high-speed recorder. Discharging continued until attainment of voltage 0.7 V. Charge of discharging was defined by multiplying the discharge current by the discharge time while average voltage was defined by numerical integration of the "voltage-time" curve. Mass of the model was determined by using of scale.

Calculation of specific energy and specific power was carried out by formulae (4) and (5), results of the calculations are presented in Table 3.

Figure 5:
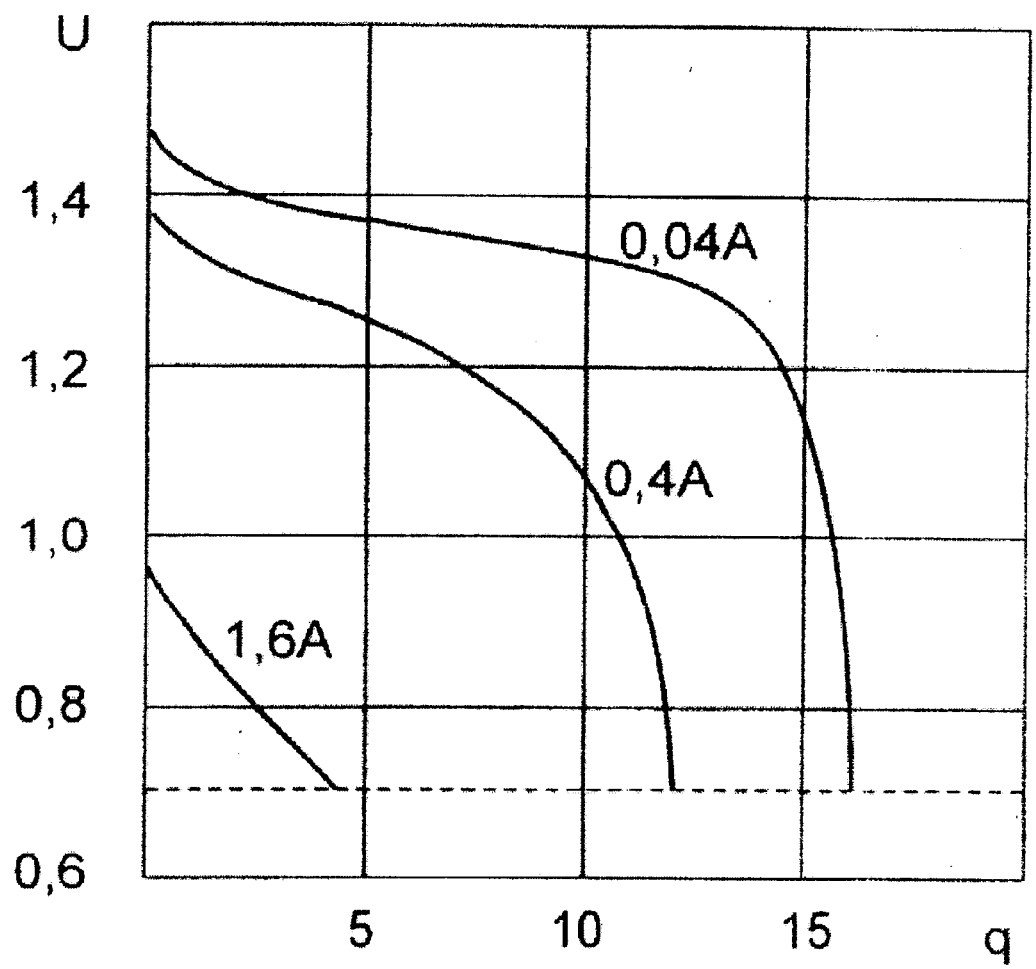
In FIG. 5 there are presented discharge curves for a model of the claimed electrochemical energy storage device with electrodes produced in accordance with the sixth and tenth examples.

In FIG. 5 there are presented discharge curves of the present model of electrochemical energy storage device. These curves have a shape intermediate between discharge curves of accumulators and those of capacitors. At small values of discharge current they are more close to discharge curves of an accumulator, at larger values—more close to discharge curves of a capacitor.

Figure 6:
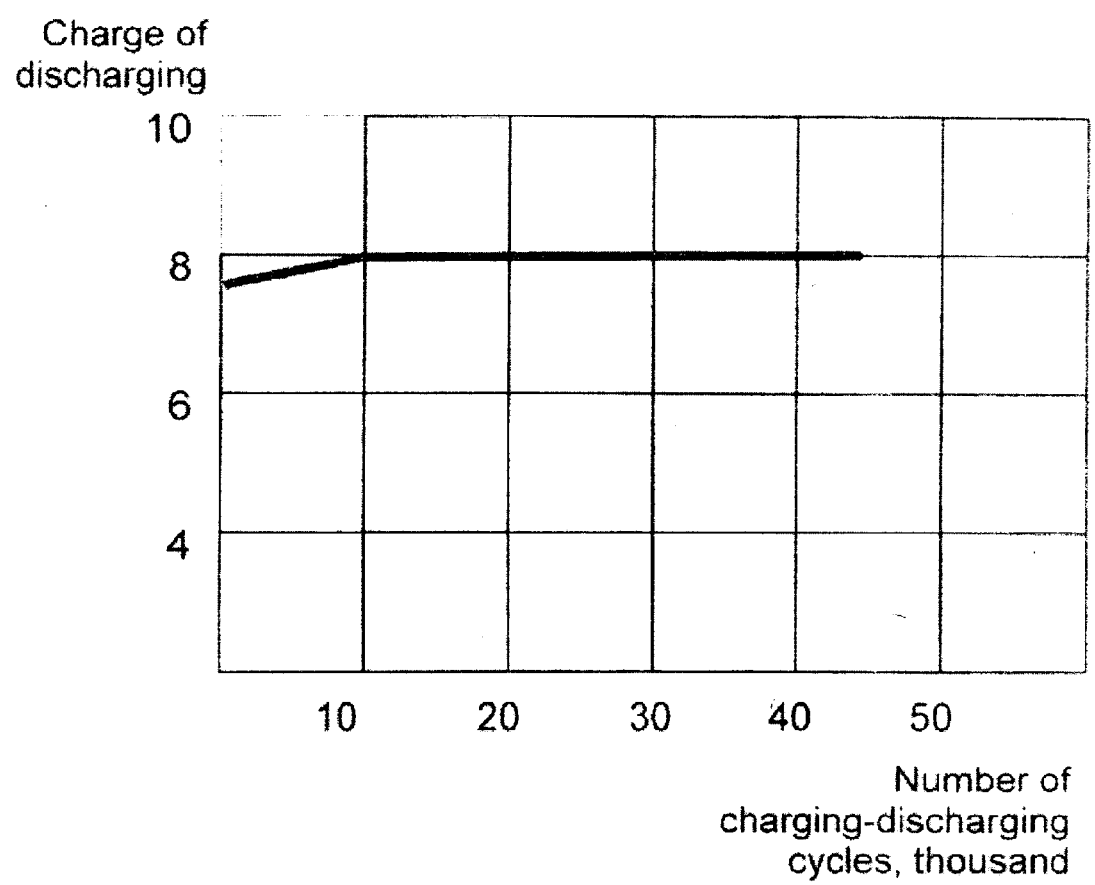
In FIG. 6 there is presented a dependence of discharging charge on number of charge/discharge cycles for a model of the claimed electrochemical energy storage device with electrodes produced in accordance with the sixth and tenth examples.

Durability test of the present model of electrochemical energy storage device under cyclic loads is illustrated by the curve in FIG. 6 which represents how discharging charge depends on number of charge/discharge cycles. The test has shown that service life exceeds 43,000 cycles during which no change in discharging charge has been registered—such was the number of cycles during the tests up to the moment of applying the patent.

Charging while cycling was carried out with a current of 0.4 A until attainment of voltage 1.5 V, then the voltage was held constant during one minute. Discharging was carried out with a current of 0.4 A until attainment of voltage 1.1 V (50% of total charge), then the cycle was repeated. Charge of discharging was determined by multiplying current (0.4 A) by discharge time in seconds. Temperature range while cycling was 18–20° C.

Increase in durability of electrochemical energy storage device with the proposed electrodes under cyclic loading as compared to the durability of prototype is quite explainable. The active elements of the claimed electrodes present compact electrolytic deposits instead of highly porous layers with large true surface so that all the reactions of chemical and electrochemical dissolution proceed here with incomparably lower rate. At the same time, reactions (7), (8), (9) proceed rapidly enough owing to high hydrogen penetrability of iron-group metals, especially of electrolytic deposits of these metals.

EXAMPLE 12

The model of electrochemical energy storage device according to the third embodiment of the claimed invention is made in the same manner as in example 11 but with other negative and positive electrodes according to examples 3 and 9 respectively (see Table 3). Use of these electrodes results in some dissimilarities in characteristics of specific energy and power of this electrochemical energy storage device as compared with the electrochemical energy storage device in example 11 (see table 3).

EXAMPLE 13

The model of electrochemical energy storage device according to the fourth embodiment of the claimed invention is assembled with negative electrode made according to example 6 and with positive electrode made as in the prototype. In comparison with the prototype the model of this electrochemical energy storage device has essential advantages in specific energy and power, moreover, it does not contain ecologically harmful cadmium. However, the model of this electrochemical storage device (see Table 3) is inferior to the model of electrochemical energy storage device described in example 11 where the same negative electrode is used but the positive electrode is made in accordance with the claimed invention. The device in example 11 also has a smaller mass due to the combination of current collector and active material functions in the active element.

EXAMPLE 14

The model of electrochemical energy storage device according to the fifth embodiment of the claimed invention is assembled with negative electrode of 0.35 mm thick carbon fabric and positive electrode according to example 10. A 4–6 $\mu$m thick nickel layer was deposited on one side of carbon fabric by method of cyclotron spraying, after that the carbon fabric was spot welded at nine points to 25 $\mu$m thick nickel foil used as collector. The rest of manufacturing conditions and procedure of measurements were as in example 11. As it is seen from Table 3, the model of such electrochemical energy storage device is substantially inferior to the models of electrochemical energy storage devices presented in examples 11 and 12 where both electrodes are made according to the claimed proposal, as well as to the model of electrochemical energy storage device presented in example 13 where the negative electrode is made according to the claimed proposal and the positive one is made as in the prototype. By specific power at high current densities the model of such an electrochemical energy storage device as in example 14 is close to the model of electrochemical energy storage device as per example 13 but is inferior to the models of electrochemical energy storage devices as per examples 11 and 12 (see Table 3).

EXAMPLE 15

The model of electrochemical energy storage device is assembled with both electrodes of known types. As positive electrode an electrode was used made as in example 13 according to the prototype while the negative electrode was made on the basis of carbon fabric as in example 14. The rest of manufacturing and measurement conditions were as in example 11. As it is seen from the data given in Table 3 the model of this electrochemical energy storage device is inferior to all the previous examples 11 to 14 both by specific energy and by specific power.

INDUSTRIAL APPLICABILITY

As can be seen from all the above all embodiments of the claimed invention it is scientific feasible, industrial performable and solve the set task, namely it increases the service life (increase in number of recharge cycles) without decreasing (and even with increasing) the specific power and energy, furthermore the ecological harmful cadmium is excluded from the structural materials of the device.

The possibility of industrial application of the claimed technical concepts is beyond any doubt because they can be realized using conventional materials and well-known industrial equipment, so that a conclusion can be drawn that the claimed invention conform the criterion "Industrial applicability" (IA).

The claimed embodiments of the invention present a substantial practical interest, opening up a new, never used before, direction in designing electrochemical energy storage devices of high specific power based on the employment of active elements in electrodes made out of electron-conductive electrolytic alloys (deposits) with excessive content of absorbed oxygen and hydrogen providing proceeding of charge-discharge redox reactions, the electrolytic alloy (deposit) functioning at the same time as current-carrying collector and as active material.

The prospects of this direction are stipulated by the potentialities of a substantial enhancement of the service life of electrochemical energy storage devices of high specific power and energy, by simplicity and low cost of their realization and by absence of ecological harmful materials in the device.

TABLE 1

Fabrication conditions of negative electrodes and their properties

| Example No. | Electrolyte composi-tion, g/l | Temperature °C. | Current density, A/cm$^2$ | Electrolysis duration, min. | Coating thickness, $\mu$m | Specific charge C/cm$^2$ | Note |
|---|---|---|---|---|---|---|---|
| 1 | NiSO$_4$-150 NiCl$_2$-50 H$_3$BO$_3$-10 | 70 | 12 | 10 | 25 | 2, 3 | Backing - nickel foil 25 $\mu$m |

TABLE 1-continued

Fabrication conditions of negative electrodes and their properties

| Example No. | Electrolyte composi-tion, g/l | Temperature °C. | Current density, A/cm² | Electrolysis duration, min. | Coating thickness, μm | Specific charge C/cm² | Note |
|---|---|---|---|---|---|---|---|
| 2 | NiSO₄-50<br>NiCl₂-150<br>H₃BO₃-10 | 50 | 10 | 10 | 20 | 2, 8 | Backing - nickel foil 25 μm |
| 3 | NiSO₄-150<br>NiCl₂-10<br>CoCl₂-10<br>H₃BO₃-10 | 50 | 10 | 10 | 20 | 2, 9 | Galvano-plastic from titanium backing |
| 4 | NiSO₄-100<br>NiCl₂-10<br>FeSO₄-30<br>H₃BO₃-10 | 70 | 15 | 10 | 30 | 3, 2 | Galvano-plastic from titanium backing |
| 5 | NiSO₄-50<br>CoCl₂-150<br>H₃BO₃-10 | 50 | 12 | 10 | 25 | 3, 0 | Galvano-plastic from titanium backing |
| 6 | NiSO₄-50<br>FeCl₂-100<br>H₃BO₃-10 | 70 | 20 | 10 | 40 | 4, 0 | Galvano-plastic from titanium backing |
| 7 | NiSO₄-50<br>NiCl₂-150<br>PdCl₂-2<br>H₃BO₃-10 | 50 | 10 | 10 | 20 | 3, 0 | Nickel foil backing 25 μm |

TABLE 2

Fabrication conditions of positive electrodes and their properties

| Example No. | Electrolyte composition, g/l | Temperature °C. | Current density, A/cm² | Electrolysis duration, min. | Coating thickness, mcm | Specific charge C/cm² | Note |
|---|---|---|---|---|---|---|---|
| 8 | NiSO₄-100<br>NiCl₂-30<br>H₃BO₃-10 | 40 | 10 | 15 | 30 | 2, 2 | Nickel foil backing 25 μm |
| 9 | NiSO₄-100<br>CoCl₂-10<br>KCl-20<br>H₃BO₃-10 | 50 | 15 | 10 | 30 | 2, 4 | Nickel-foil backing 25 μm |
| 10 | NiSO₄-100<br>CoCl₂-10<br>ZnCl₂-20<br>H₃BO₃-10 | 50 | 15 | 15 | 45 | 4, 3 | Galvano-plastic from titanium backing |

TABLE 3

Properties of energy storage models

| Example No. | Negative electrode / Positive electrode | Model mass, g | Current, A | Discharging charge, C | Average discharging voltage, V | Specific energy, J/g | Average specific power, W/g |
|---|---|---|---|---|---|---|---|
| 11 | electrode as per example 6 / electrode as per example 10 | 0.32 | 0.04<br>0.4<br>1.6 | 16<br>12<br>4.4 | 1.2<br>1.1<br>0.85 | 60<br>41<br>11.7 | 0.15<br>1.37<br>4.25 |

TABLE 3-continued

Properties of energy storage models

| Example No. | Negative electrode / Positive electrode | Model mass, g | Current, A | Discharging charge, C | Average discharging voltage, V | Specific energy, J/g | Average specific power, W/g |
|---|---|---|---|---|---|---|---|
| 12 | electrode as per example 3 / electrode as per example 9 | 0.25 | 0.04<br>0.4<br>1.6 | 9.6<br>7.2<br>2.8 | 1.2<br>1.1<br>0.85 | 46<br>31.7<br>9.5 | 0.19<br>1.76<br>5.4 |
| 13 | electrode as per example 6 / electrode as per prototype | 0.39 | 0.04<br>0.4<br>1.6 | 16<br>12.8<br>5.2 | 1.2<br>1.1<br>0.85 | 49.2<br>36.1<br>11.3 | 0.12<br>1.13<br>3.50 |
| 14 | Carbon fabric 0.35 mm / Electrode as per example 10 | 0.43 | 0.04<br>0.4<br>1.6 | 8.4<br>6.0<br>2.8 | 1.05<br>1.0<br>0.9 | 20.5<br>14<br>5.9 | 0.10<br>0.93<br>3.35 |
| 15 | Carbon fabric 0.35 mm / Electrode as per prototype | 0.50 | 0.04<br>0.4<br>1.6 | 8.4<br>6.4<br>4.0 | 1.05<br>1.0<br>0.9 | 17.6<br>12.8<br>7.2 | 0.084<br>0.80<br>2.90 |

What is claimed is:

1. A positive electrode for an electrochemical energy storage device of high specific power comprising active element interacting with aqueous alkaline electrolyte of the electrochemical energy storage device in the process of redox charge-discharge reactions characterized in that the active element is made of electron-conductive electrolytic alloy having the composition $M_{(I-x-y)}O_xH_y$, where M is nickel or nickel-based alloy, x is the atomic fraction of absorbed oxygen in the electrolytic alloy being within the limits of 0.01 to 0.4, y is the atomic fraction of absorbed hydrogen in the electrolytic alloy being within the limits of 0.01 to 0.4, whereby the said electrolytic alloy simultaneously fulfils the functions of current-carrying collector and of active material participating in the processes of redox charge-discharge reactions.

2. The electrode according to claim 1 characterized in that the atomic fraction x of absorbed oxygen in the electrolytic alloy is preferably within the limits of 0.05 to 0.4.

3. The electrode according to claim 1 characterized in that the electrolytic alloy is obtained by way of simultaneous electrochemical cathode co-deposition of a metal belonging to the above mentioned M metal group and its oxides and/or hydroxides.

4. The electrode according to claim 1 characterized in that the current supply is effected directly to the active element which is structurally designed as an electrolytic deposit being mechanically, chemically or electrochemically separated from an electro-conductive backing on which it had been deposited.

5. The electrode according to claim 1 characterized in that the current supply is effected to the active element via a backing, the active element being structurally designed as an electrolytic deposit on one or both sides of the electro-conductive backing made of a material chemically and electrochemically stable in the electrolyte of the electrochemical energy storage device.

6. A negative electrode for an electrochemical energy storage device of high specific power comprising active element interacting with aqueous alkaline electrolyte of the electrochemical energy storage device in the process of redox charge-discharge reactions characterized in that the active element is made of electron-conductive electrolytic alloy having the composition $M_{(I-x-y)}O_xH_y$, where M is a metal of the group: iron, nickel, cobalt, or an alloy on the basis of one of the metals of this group, x is the atomic fraction of absorbed oxygen in the electrolytic alloy being within the limits of 0.01 to 0.4, y is the atomic fraction of absorbed hydrogen in the electrolytic alloy being within the limits of 0.01 to 0.4, whereby the said electrolytic alloy simultaneously fulfils the functions of current-carrying collector and of active material participating in the processes of redox charge-discharge reactions.

7. The electrode according to claim 6 characterized in that the atomic fraction y of absorbed hydrogen in the electrolytic alloy is preferably within the limits of 0.05 to 0.4.

8. The electrode according to claim 6 characterized in that the electrolytic alloy is obtained by way of simultaneous electrochemical cathode co-deposition of a metal belonging to the above mentioned M metal group and its oxides and/or hydroxides.

9. The electrode according to claim 6 characterized in that the current supply is effected directly to the active element which is structurally designed as an electrolytic deposit being mechanically, chemically or electrochemically separated from an electro-conductive backing on which it had been deposited.

10. The electrode according to claim 6 characterized in that the current supply is effected to the active element via a backing, the active element being structurally designed as an electrolytic deposit on one or both sides of the electro-conductive backing made of a material chemically and electrochemically stable in the electrolyte of the electrochemical energy storage device.

11. An electrochemical energy storage device of high specific power containing at least one negative and one positive electrodes submerged in aqueous alkaline electrolyte and separated with a layer of ion-conductive but non electron-conductive material, whereby each electrode contains an active element interacting with the electrolyte in the process of charge-discharge redox reactions characterized in that the active element of each electrode is made out of an electron-conductive electrolytic alloy having composition $M_{(I-x-y)}O_xH_y$, where M for positive electrode is nickel or an alloy on the basis of nickel, M for negative electrode is a metal out of the following metal group: iron, nickel, cobalt or an alloy on the basis of one of the metals of this group, x is an atomic fraction of absorbed oxygen in the electrolytic alloy which is within the limits of 0.01 to 0.4, y is an atomic fraction of absorbed hydrogen in the electrolytic alloy which is within the limits of 0.01 to 0.4, whereby the above mentioned electrolytic alloy simultaneously fulfills the functions of current-carrying collector and of active material participating in the processes of redox charge-discharge reactions of each of the electrodes.

12. The electrochemical energy storage device according to claim 11 characterized in that for the positive electrode the atomic fraction x of absorbed oxygen in the electrolytic alloy is preferably within the limits of 0.05 to 0.4 while for the negative electrode atomic fraction y of absorbed hydrogen in the electrolytic alloy is preferably within the limits of 0.05 to 0.4.

13. An electrochemical energy storage device of high specific power containing at least one negative and one positive electrodes submerged in aqueous alkaline electrolyte and separated with a layer of ion-conductive but non electron-conductive material, whereby each electrode contains an active element interacting with the electrolyte in the process of charge-discharge redox reactions characterized in that the active element of the negative electrode is made of an electron-conductive electrolytic alloy having composition $M_{(I-x-y)}O_xH_y$, where M is a metal out of the following group: iron, nickel, cobalt or an alloy on the basis of one of the metals of the said group, x is an atomic fraction of absorbed oxygen in the electrolytic alloy which is within the limits of 0.01 to 0.4, y is an atomic fraction of absorbed hydrogen in the electrolytic alloy which is within the limits of 0.01 to 0.4, whereby the said electrolytic alloy simultaneously fulfils the functions of both current-carrying collector and of active material participating in the processes of redox charge-discharge reactions of negative electrode.

14. The electrochemical energy storage device according to claim 13 characterized in that for the negative electrode atomic fraction y of absorbed hydrogen in the electrolytic alloy is preferably within the limits of 0.05 to 0.4.

15. An electrochemical energy storage device of high specific power containing at least one negative and one positive electrodes submerged in aqueous alkaline electrolyte and separated with a layer of ion-conductive but non electron-conductive material, whereby each electrode contains an active element interacting with the electrolyte in the process of charge-discharge redox reactions characterized in that active element of positive electrode is made of an electron-conductive electrolytic alloy having composition $M_{(I-x-y)}O_xH_y$, where M is nickel or an alloy on the basis of nickel, x is an atomic fraction of absorbed oxygen in the electrolytic alloy being within the limits of 0.01 to 0.4, y is atomic fraction of absorbed hydrogen in the electrolytic alloy being within the limits of 0.01 to 0.4, whereby the said electrolytic alloy simultaneously fulfils the functions of both current-carrying collector and of active material participating in the processes of redox charge-discharge reactions of positive electrode.

16. The electrochemical energy storage device according to claim 15 characterized in that for the positive electrode the atomic fraction x of absorbed oxygen in the electrolytic alloy is preferably within the limits of 0.05 to 0.4.

17. The electrode according to claim 5, wherein said positive electrode is obtained via electrodeposition of said nickel on said electro-conductive backing of nickel foil, said nickel foil being 25 um thick under conditions defined as 100 g/l $NiSO_4$, 30 g/l $NiCl_2$, 10 g/l $H_3BO_3$, a temperature of 40° C., a current density of 10 A/cm2, an electrolysis duration of 15 minutes, a coating thickness of 30 mcm, and a specific charge of 2,2 C/cm2, thereby facilitating an obtained electrolytic alloy composition being $Ni_{0.65}\,O_{0.18}\,H_{0.17}$, wherein a mass thereof being 25 mg/cm2 and having a specific charge of 88 C/g.

18. The electrode according to claim 5, wherein said positive electode is obtained via electrodeposition of a nickel-cobalt alloy on a backing of nickel foil, said nickel foil being 25 um thick under conditions defined as 100 g/l $NiSO_4$, 10 g/l $CoCl_2$, 20 g/l KCl, 10 g/l $H_3BO_3$, a temperature of 50° C., a current density of 15 A/cm2, an electrolysis duration of 10 minutes, a coating thickness of 30 mcm, and a specific charge of 2,4 C/cm2, thereby facilitating an obtained electrolytic composition being $Ni_{0.55}\,Co_{0.1}\,O_{0.19}\,H_{0.6}$, wherein a mass thereof being 25 mg/cm2 and having a specific charge of 96 C/g.

19. The electrode according to claim 10, wherein said negative electrode is obtained via electrodeposition of a nickel-iron alloy on polished titanium backing following mechanical separation of deposit from said polished titanium backing, wherein ferrous iron sulphate is added to electrolyte under conditions defined as 100 g/l Ni SO4, 10 g/l NiCl2, 30 g/l FeSO4, 10 g/l H3BO3, a temperature of 70° C., a current density of 10 minutes, an electrolysis duration of 10 minutes, a coating thickness of 30 um, and a specific charge of 3,2 C/cm2, thereby facilitating an obtained electrolytic compostion being $Ni_{0.53}\,Fe_{0.13}\,O_{0.14}\,H_{0.20}$, wherein a mass thereof being 24 mg/cm2 and having a specific charge of 133 C/g.

20. The electrode according to claim 10, wherein said negative electrode is obtained via electrodeposition of a nickel-palladium alloy on a backing of rolled nickel foil, said rolled nickel foil being 25 um thick under conditions defined as 50 g/l $NiSO_4$, 150 g/l $NiCl_2$, 2 g/l $PdCl_2$, 10 g/l $H_3BO_3$, a temperature of 50° C., a current density of 10 A/cm2, an electrolysis duration of 10 minutes, a coating thickness of 20 um, and a specific charge of 3,0 C/cm2, thereby facilitating an obtained electrolytic composition being $Ni_{0.60}\,Pd_{0.03}\,O_{0.16}\,H_{0.21}$, wherein a mass thereof being 17 mg/cm2 and having a specific charge of 176 C/g.

* * * * *